United States Patent [19]

Kato et al.

[11] Patent Number: 4,946,147
[45] Date of Patent: Aug. 7, 1990

[54] FLUID-FILLED ELASTIC MOUNTING STRUCTURE HAVING ORIFICES

[75] Inventors: Rentaro Kato, Kasugai; Ryouji Kanda, Komaki; Kiyohiko Yoshida, Kasugai, all of Japan

[73] Assignee: Tokai Rubber Industries, Ltd., Aichi, Japan

[21] Appl. No.: 322,126

[22] Filed: Mar. 13, 1989

[30] Foreign Application Priority Data

Mar. 19, 1988 [JP]  Japan .................................. 63-66777

[51] Int. Cl.$^5$ .............................................. B60G 15/04
[52] U.S. Cl. ................................. 267/140.1; 248/562; 267/219
[58] Field of Search .............. 267/140.1 A, 140.1 AE, 267/140.1 R, 140.1 E, 219, 35; 180/312; 248/562, 636, 638, 550

[56] References Cited

U.S. PATENT DOCUMENTS

| | | | |
|---|---|---|---|
| 4,679,778 | 7/1987 | Tabata et al. | 267/140.1 |
| 4,787,609 | 11/1988 | Dan et al. | 267/35 X |

FOREIGN PATENT DOCUMENTS

| | | | |
|---|---|---|---|
| 3140783 | 4/1983 | Fed. Rep. of Germany | 267/140.1 |
| 113933 | 5/1987 | Japan | 267/140.1 |
| 278334 | 12/1987 | Japan | 267/140.1 |

OTHER PUBLICATIONS

Laid-open Publication No. 57-9340 of unexamined Japanese Patent Application (published in 1982).

Primary Examiner—Andres Kashnikow
Assistant Examiner—Matthew C. Graham
Attorney, Agent, or Firm—Oliff & Berridge

[57] ABSTRACT

A fluid-filled elastic mounting structure including a first fand a second support members disposed in spaced-apart relation with each other in a load-receiving direction, an elastic body elastically connecting the support members, a closure member secured to the second support member, so as to define therebetween a fluid chamber filled with a non-compressible fluid between the elastic body and the second support member, a partition assembly disposed within the fluid chamber, so as to divide the fluid chamber into a pressure-receiving chamber, and an equilibrium chamber, and a first orifice for fluid communication between the two chambers. The partition assembly has an opening communicating with the two chambers. A first and a second movable member are disposed within the opening of the partition assembly, such that the two movable members are spaced apart from each other in the load-receiving direction so as to define an intermediate chamber. A second orifice is formed in association with one of the movable members, for fluid communication of the intermediate chamber with the pressure-receiving or equilibrium chamber.

11 Claims, 2 Drawing Sheets

FLUID-FILLED ELASTIC MOUNTING STRUCTURE HAVING ORIFICES

BACKGROUND OF THE INVENTION

1. Field of the Invention

The present invention is concerned generally with a fluid-filled elastic mounting structure, and more particularly with a fluid-filled elastic mounting structure suitablely used for example as an automotive engine mount, which exhibits an improved damping characteristic with respect to low-frequency large-amplitude vibrations, and a sufficiently low dynamic spring rate or constant with respect to medium-frequency medium-amplitude to high-frequency small-amplitude vibrations.

2. Discussion of the Prior Art

A mounting device or structure for flexibly attaching an engine or engine unit of a motor vehicle to the body of the vehicle is generally required to exhibit excellent vibration damping characteristics for the low-frequency large-amplitude vibrations applied thereto, and at the same time provide an improved vibration isolating effect with respect to a comparatively wide range of vibration frequencies, i.e., medium-frequency medium-amplitude to high-frequency small-amplitude vibrations. In particular, such a mounting structure is required to exhibit an excellent damping effect when the low-frequency large-amplitude vibrations are applied thereto.

In an attempt to satisfy the above requirements, there has been proposed a fluid-filled elastic mounting structure including (a) first and second support members which are opposed and spaced apart from each other in load-receiving direction in which a vibrational load is applied to the mounting structure, (b) an elastic body interposed between the first and second support members, for elastically connecting these two support members, (c) a closure member which has a flexible portion and which is secured to the second support member, so as to cooperate with the elastic member to define therebetween a fluid chamber filled with a non-compressible fluid, (d) a partition assembly disposed within the fluid chamber, so as to divide the fluid chamber into a pressure-receiving chamber on the side of the elastic body, and an equilibrium chamber on the side of the closure member, and (e) an orifice for fluid communication between the pressure-receiving chamber and the equilibrium chamber.

The fluid-filled elastic mounting structure constructed as described above is capable of excellentely damping low-frequency vibrations, based on resonance of the fluid mass flowing through the orifice, by tuning the orifice so that the resonance frequency of the fluid mass in the orifice is adjusted to a relatively low level corresponding to the frequency range of the vibrations to be damped.

While the tuning of the orifice enables the mounting structure to exhibit improved damping characteristics for the low-frequency vibrations, the vibration isolating capability of the mounting structure upon application of the medium to high-frequency vibrations is undesirably low, due to an increased dynamic spring rate of the structure because the non-compressible fluid is less likely to flow through the orifice.

In view of the above drawback, an improvement of the fluid-filled elastic mounting structure of the type discussed above is proposed according to laid-open Publication No. 57-9340 of unexamined Japanese Patent Application. This mounting structure employs a movable member which is disposed in the partition assembly between the pressure-receiving and equilibrium chambers. The movable member is deformable or displaceable over a suitable distance in the load-receiving direction, so that a pressure difference between the pressure-receiving and equilibrium chambers may be absorbed by the oscillating deformation or displacement of the movable member, in order to avoid a rise in the pressure in the pressure-receiving chamber.

The deformation or displacement of the movable member which involves flows of the fluid is effective to reduce the amount of transmission of the input vibrations between the first and second support members, when the frequencies of the vibrations are in the neighborhood of the resonance frequency of the fluid. However, the dynamic spring constant of the mounting structure is extremely increased when the structure is subject to vibrations having frequencies higher than the resonance frequency of the fluid. Therefore, the resonance frequency of the fluid flows due to the oscillating displacement of the movable member is adjusted to a relatively high level, for the purpose of minimizing the amount of reduction in the vibration isolating function of the mounting structure which results from the increased dynamic spring constant. Although this arrangement enables the mounting structure to exhibit a sufficiently low dynamic spring constant for the vibrations having comparatively high frequencies around the resonance frequency of the fluid, the mounting structure is uncapable of providing a sufficient vibration isolating effect with respect to the medium-frequency vibrations.

Thus, the proposed fluid-filled elastic mounting structure having the movable member is not satisfactory in meeting the above-indicated requirements, particularly, in terms of its dynamic spring constant with respect to the medium-frequency vibrations. This problem is serious especially where the mounting structure is used as an engine mount for an automotive vehicle, which is required to provide not only a high damping effect for low-frequency large-amplitude vibrations such as engine shakes of 5–15 Hz, but also a high isolating effect for both medium-frequency medium-amplitude vibrations such as engine-idling vibrations of 20–30 Hz and high-frequency small-amplitude vibrations such as booming noises of 100–300 Hz.

SUMMARY OF THE INVENTION

It is therefore an object of the present invention to provide a fluid-filled elastic mounting structure which exhibits improved damping characteristics for low-frequency large-amplitude vibrations, and excellent isolating characteristics with a sufficiently low dynamic spring rate for medium-frequency medium-amplitude to high-frequency small-amplitude vibrations over a relatively wide range of frequencies.

The above object may be accomplished according to the principle of the present invention, which provides a fluid-filled elastic mounting structure including (a) a first and a second support members which are opposed to and spaced apart from each other in load-receiving direction in which a vibrational load is applied to the mounting structure, (b) an elastic body interposed between the first and second support members, for elastically connecting these two support members, (c) a closure member which has a flexible portion and which is secured to the second support member, so as to cooperate with the elastic body to define therebetween a fluid chamber filled with a non-compressible fluid, (d) a partition assembly disposed within the fluid chamber, so as to divide the fluid chamber into a pressure-receiving chamber on the side of the elastic body, and an equilibrium chamber on the side of the closure member, and (e) a first orifice for fluid communication between the pressure-receiving chamber and the equilibrium chamber, wherein the improvement comprises: an opening formed in a central portion of the partition assembly, such that the pressure-receiving chamber and the equilibrium chamber communicate with each other through the opening; a first and a second movable member which are disposed within the opening of the partition assembly, such that the first and second movable members are spaced apart from each other by a suitable distance in the load-receiving direction of the mounting structure, and cooperate with each other t define an intermediate fluid chamber; and a second orifice formed in association with one of the first and second movable members, for fluid communication of the intermediate fluid chamber with one of the pressure-receiving and equilibrium chambers which corresponds to the above-indicated one movable member.

The fluid-filled elastic mounting structure of the present invention constructed a described above exhibits improved vibration isolating characteristics or a sufficiently low dynamic spring constant with respect to medium-frequency medium-amplitude vibrations, as compared with the conventional fluid-filled elastic mounting structure, while maintaining excellent vibration damping characteristics with respect to low-frequency large-amplitude vibrations, and high vibration isolating characteristics with respect to high-frequency small-amplitude vibrations. Accordingly, the instant mounting structure may be suitably used as an engine mount for a motor vehicle, capable of effectively isolating the engine idling vibrations, in particular.

Further, the instant elastic mounting structure can effectively utilize the comparatively large opening of the partition assembly between the pressure-receiving and equilibrium chambers, for providing the first and second movable members in an oscillating manner within a mass of the non-compressible fluid adjacent to the opening. Thus, the resonance frequency of the fluid oscillating with the movable members may be easily adjusted to a relatively high level corresponding to a desired range of frequencies of the vibrations that should be isolated. Namely, the partition assembly and the movable members have a comparatively high degree of freedom of design for obtaining the intended results.

Where the first movable member is disposed o the side of the pressure-receiving chamber, the second orifice may be associated with the first movable member, for fluid communication between the intermediate chamber and the pressure-receiving chamber.

In the above form of the invention, the partition assembly may include an orifice-defining member which is secured to the first movable member such that the orifice-defining member and the first movable member define therebetween an annular space. The orifice-defining member and the first movable member have communication holes through which the annular space communicates with the pressure-receiving chamber and the intermediate chamber.

In the above case, the first movable member preferably has a maximum distance of movement in the load-receiving direction, which is smaller than that of the second movable member.

In another form of the present invention, the partition assembly includes a first and a second annular members which are secured at radially outer circumferential edges thereof to the second support member. In this case, the central opening of the partition assembly is defined by the radially inner circumferential edges of the annular members. The annular members may cooperate with each other to define an annular space therebetween, and have communication holes through which the annular space communicates with the pressure-receiving and equilibrium chambers. In this case, the first orifice is defined by the annular space and the communication holes of the first and second annular members.

The partition assembly may further include a third annular member secured to one of the first and second annular members which is adjacent to the pressure-receiving chamber. The third annular member and the first and second annular members have respective support flanges whose radially inner circumferential edges define the central opening. The support flanges are spaced apart from each other in the load-receiving direction, so that the first movable member is movable between the support flanges of the third annular member and the above-indicated one of the first and second annular members, while the second movable member is movable between the support flanges of the first and second annular members.

The elastic body may have a stopper portion which is abuttable on the first support member, to thereby prevent an excessive amount of relative displacement of the first and second support members toward each other in the load-receiving direction. The elastic mounting structure may further comprises a stopper member for preventing an excessive amount of relative displacement of the first and second support members away from each other in the load-receiving direction.

BRIEF DESCRIPTION OF THE DRAWINGS

The above and optional objects, features and advantages of the present invention will become more apparent by reading the following detailed description of a presently preferred embodiment of the invention, when considered in connection with the accompanying drawings, in which.

DETAILED DESCRIPTION OF THE PREFERRED EMBODIMENT

Figure 1:
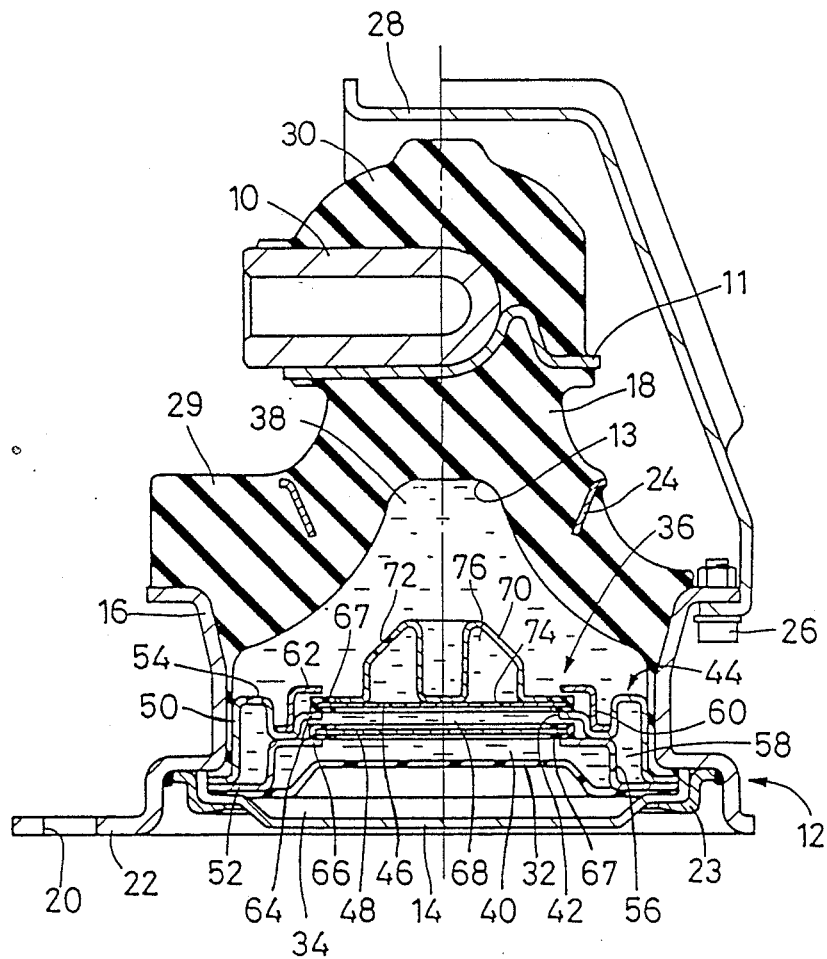
FIG. 1 is an elevational view in vertical cross section of one embodiment of a fluid-filled elastic mounting structure of the invention in the form of an engine mount for a motor vehicle, taken along line I—I of FIG. 2.
Figure 2:
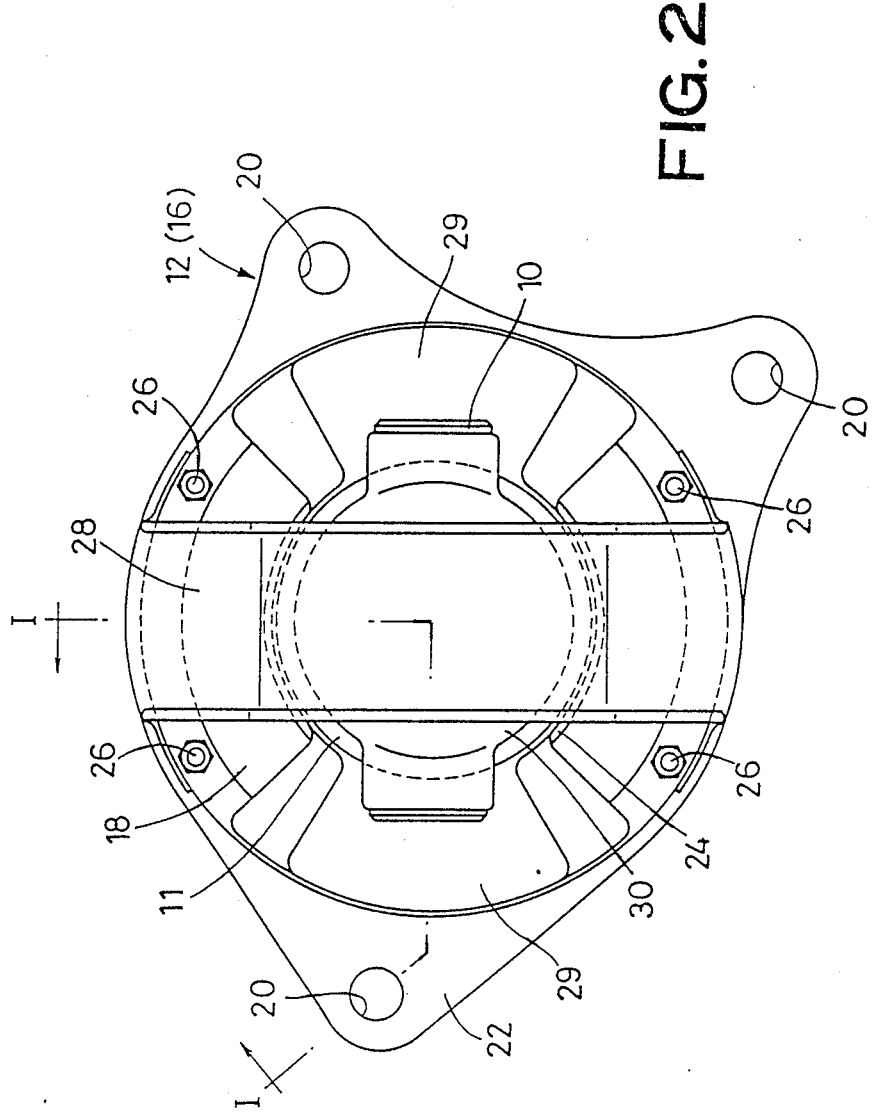
FIG. 2 is a plan view of the engine mount shown in FIG. 1.

Referring to FIGS. 1 and 2, reference numerals 10 and 12 denote a first and a second support member of the engine mount, respectively. The first and second support members 10, 12 are made of a suitable metallic material, and are disposed opposite to each other in a spaced-apart relation in a load-receiving direction (vertical direction as seen in FIG. 1) in which a vibrational load is applied to the instant engine mount.

The first support member 10 is a relatively thick-walled hollow cylindrical member such that the longitudinal axis extends in the horizontal direction (as seen in FIG. 1). To the lower half of the outer circumferential surface of the cylindrical first support member 10, there is secured a generally disk-like member 11. The second support member 12 is a generally cup-shaped structure having a comparatively large diameter. The cup-shaped structure consists of a generally hollow cylindrical portion 16 which has a relatively large diameter and a relatively small wall thickness and whose axis is perpendicular to the axis of the first support member 10, and a dished base portion 14 which is calked to the lower open end of the cylindrical portion 16, so as to close the lower opening of the cylindrical portion 16. The cylindrical portion 16 has an integrally formed flange 22 radially outwardly extending from its lower end. The flange 22 has three mounting holes 20 for bolts for fixing the instant engine mount. Reference numeral 23 designates an annular calking member which is welded to the cylindrical portion 16 of the second support member 12. The calking member 23 is used to calk the dished base portion 14 to the cylindrical portion 16.

The assembly of the first support member 10 and the disk-like member 11, and the second support member 12 are positioned such that the plane of the disk-like member 11 is perpendicular to the load-receiving direction of the engine mount, i.e., perpendicular to the axis of the second support member 12, and such that the disk-like member 11 is spaced apart from the upper opening of the hollow cylindrical portion 16 in the load-receiving direction. The disk-like member 11 and the second support member 12 are disposed coaxially or concentrically with each other, as shown in FIGS. 1 and 2.

The first and second support members 10, 12 constructed and positioned as described above are elastically connected by an elastic body 18 interposed therebetween. More specifically, the elastic body 18 has a recessed portion 13 on the side of the second support member 12, and assumes a generally truncated conical shape in the vertical cross section, as indicated in FIG. 1. The elastic body 18 is secured by vulcanization at its large-diameter end to the upper end portion of the hollow cylindrical portion 16 of the second support member 12, and at its small-diameter end to the first support member 10 (more precisely, to the disk-like member 11). Reference numeral 24 denotes an annular reinforcing member made of a metallic material, which is embedded within the elastic body 18 such that the reinforcing member 24 is coaxial with the truncated conical elastic body 18.

The elastic body 18 includes two stopper portions 29, 29 which are aligned with the opposite axial end portions of the cylindrical first support member 10, in the circumferential direction of the elastic body, as indicated in FIGS. 1 and 2. The stopper portions 29 are spaced a suitable distance from the first support member 10, in the load-receiving direction of the engine mount, so that the axial end portions of the first support member 10 (and/or a shaft member inserted through the first support member 10 for fixing the engine mount to an engine unit of the motor vehicle) may abut on the stopper portions 29, to thereby avoid an excessive amount of relative displacement of the first and second support members 10, 12 toward each other in the load-receiving direction, when a vibrational load having a large amplitude is applied to the engine mount.

The instant engine mount is provided with a stopper plate 28 which is secured by bolts 26 to the second support member 12. The stopper plate 28 has an upper portion which extends above the first support member 10, in the direction perpendicular to the axis of the first support member 10. Between the upper portion of the stopper plate 28 and the first support member 10, there is formed a stopper rubber member 30 such that the stopper rubber member 30 is secured by vulcanization to the first support member 10 and the disk-like member 11, and such that there is left a suitable clearance between the stopper rubber member 30 and the upper portion of the stopper plate 28, as indicated in FIG. 1. An abutting contact of the stopper rubber member 30 with the stopper plate 28 may prevent an excessive amount of relative displacement of the first and second support members 10, 12 away from each other in the load-receiving direction.

While the stopper rubber member 30 may be formed of the same rubbery material as the elastic body 18, as an integral part of the elastic body 18, it is also possible to form the elastic body 18 and the stopper rubber member 30 of different materials, as separate members secured to the assembly of the first support member 10 and disk-like member 11. In the latter case, the hardness or stiffness of the stopper rubber member 30 may be selected irrespective of the desired spring characteristics of the engine mount (irrespective of the stiffness of the elastic body 18).

The instant engine mount is installed on the vehicle to flexibly mount the engine unit on the body of the vehicle, such that a suitable shaft or rod inserted through the first support member 10 is secured to the engine unit, while the second support member 12 is fixed at its flange 22 to the vehicle body, with bolts extending through the mounting holes 20.

Within the second support member 12 whose opening is closed by the elastic body 18 having the recessed portion 13, there is fixedly disposed a closure member in the form of a dished flexible diaphragm 32. This flexible diaphragm 32 is secured to the second support member 12, such that the radially outer circumferential edge is fluid-tightly gripped by and between the dished base portion 14 and the lower end portion of the hollow cylindrical portion 16. Thus, there is formed an enclosed fluid chamber between the flexible diaphragm 32 and the recessed portion 13 of the elastic body 18. The fluid chamber is filled with a suitable non-compressible fluid such as water or polyalkylene glycol. Further, the diaphragm 32 cooperates with the dished base portion 14 of the second support member 12 to define therebetween an air chamber 34, which permits the diaphragm 32 to elastically yield in the load-receiving direction.

Within the fluid chamber or the second support member 12, there is also fixedly disposed a partition assembly indicated generally at 36 in FIG. 1. The partition assembly 36 has a generally circular shape as viewed in the load-receiving direction, and is fluid-tightly secured to the second support member 12, at its radially outer circumferential edge gripped by and between the base and cylindrical portions 14, 16, like the flexible diaphragm 32. The partition assembly 36 divides the fluid chamber into a pressure-receiving chamber 38 on the side of the elastic body 18, and an equilibrium chamber 40 on the side of the diaphragm 32. The pressure-receiving chamber 38 is subject to a change in the fluid pressure upon deformation or displacement of the elastic body 18 relative to the second support member 12 (partition assembly 36) when a vibrational load is applied to the engine mount in the axial or load-receiving direction. The corresponding pressure change in the equilibrium chamber 40 is avoided due to deformation or displacement of the flexible diaphragm 32, in the presence of the air chamber 34.

The partition assembly 36 consists of an annular structure 44 having a central opening 42 communicating with the pressure-receiving and equilibrium chambers 38, 40, and first and second movable members in the form of rigid disk-like movable plates 46, 48 which are disposed within the central opening 42, so as to close the opening 42. The opening 42 and the movable plates 46, 48 have a relatively large diameter.

Described more specifically, the annular structure 44 includes two annular members 50, 52 which are fluid-tightly gripped at their radially outer circumferential edges between the base and cylindrical portions 14, 16 of the second support member 12. The annular members 50, 52 are superposed on each other in the load-receiving direction, so as to define an annular space therebetween. The annular members 50, 52 have communication holes 54, 56, respectively, through which the annular space indicated above is held in fluid communication with the pressure-receiving and equilibrium chambers 38, 40. Thus, the two annular members 50, 52 provide a first orifice 58 for fluid communication between the two chambers 38, 40.

When a vibrational load is applied between the first and second support members 10, 12, a pressure difference occurs between the pressure-receiving and equilibrium chambers 38, 40, and the non-compressible fluid is forced to flow through the first orifice 58, between the two chambers 38, 40.

The annular structure 44 further includes a third annular member 60 secured on the outer surface of the annular member 54 adjacent to the pressure-receiving chamber 38. The three annular members 60, 50, 52 have respective annular support flanges 62, 64, 66 whose radially inner edges define the central opening 42 of the partition assembly 36. These three annular support flanges 62, 64, 66 are spaced apart from each other in the axial direction of the annular members 50, 52, 60, or in the load-receiving direction. A spacing between the flanges 62 and 64, and a spacing between the flanges 64 and 66 are determined as described below.

The first and second rigid movable plates 46, 48 are disposed parallel to each other and spaced apart from each other by a suitable distance in the load-receiving direction of the engine mount, such that the circumferential edge of the first movable plate 46 is interposed between the support flanges 62, 64 of the annular members 60, 50 while the circumferential edge of the second movable plate 48 is interposed between the support flanges 64, 66 of the annular members 50, 52. The first and second movable plates 46, 48 define therebetween an intermediate chamber 68 which is disposed between the pressure-receiving and equilibrium chambers 38, 40.

The first and second rigid movable plates 46, 48 are made of a rigid material such as metals. The circumferential edge portions of these movable plates 46, 48 have a thickness smaller than the spacing between the support flanges 62, 64, and the spacing between the support flanges 64, 66. The movements of the movable plates 46, 48 in the load-receiving direction are limited by abutting contacts of the edge portions of the movable plates with the support flanges 62, 64, 66. For absorbing shocks upon abutment of the movable plates 46, 48 against the support flanges 62, 64, 66 and reducing resultant impact noises, the edge portions of the movable plates 46, 48 are covered by annular rubber layers 67.

When a vibrational load is applied between the first and second support members 10, 12 in the load-receiving direction, a pressure difference arises between the pressure-receiving and equilibrium chambers 38, 40, whereby the first and second movable plates 46, 48 are oscillated within the opening 42 of the partition assembly 36, in the load-receiving direction, so as to absorb or accommodate the pressure difference. Thus, the non-compressible fluid is forced to flow between the pressure-receiving and equilibrium chambers 38, 40.

Further, the first rigid movable plate 46 is formed with a generally hat-shaped orifice-defining member 70 secured to its upper surface on the side of the pressure-receiving chamber 38. The orifice-defining member 70 is disposed substantially within the pressure-receiving chamber 38, so as to permit the first movable plate 46 to move in the load-receiving direction. The orifice-defining member 70 has a central recessed portion, and cooperates with the first movable plate 46 to define therebetween an annular fluid passage concentric with the movable plate 46. The orifice-defining member 70 has communication holes 72, while the first movable plate 46 has communication holes 74, so that the annular space defined within the orifice-defining member 70 and the communication holes 72, 74 cooperate with each other to define a second orifice 76 for fluid communication between the intermediate chamber 68 and the pressure-receiving chamber 38.

In the present embodiment, the first and second rigid movable plates 46, 48 have substantially the same surface area, and the second movable plate 48 has a maximum distance of movement $\delta2$ which is larger than that $\delta1$ of the first movable plate 46. Consequently, a maximum change in volume of the intermediate chamber 68 which arises from the movement of the second movable plate 48 is larger than that which arises from the movement of the first movable plate 46.

When the amount of pressure change in the pressure-receiving chamber 38 caused by the vibrational load applied between the first and second support members 10, 12 cannot be completely absorbed by the movement of the first movable plate 46, the second movable plate 48 is displaced, with the volume of the intermediate chamber 68 changing to accommodate an unabsorbed amount of the pressure change, with the fluid flowing between the pressure-receiving and intermediate chambers 38, 68 through the second orifice 76. When the fluid is forced to flow through the second orifice 76 as described above, the intermediate chamber 68 functions as an equilibrium chamber whose pressure change is prevented by the movement of the second movable plate 48.

It will be understood from the foregoing description that the engine mount according to the instant embodiment of the invention constructed as described above has three fluid passages through which the non-compressible fluid is forced to flow due to a pressure change in the pressure-receiving chamber 38 upon application of a vibrational load, namely, the first orifice 58 and the opening 42 which are both provided between the pressure-receiving and equilibrium chambers 38, 40, and the second orifice 76 which is provided between the pressure-receiving and intermediate chambers 38, 68. The fluid flows through the opening 42 are restricted by the first and second movable plates 46, 48, while the fluid flows through the second orifice 76 are restricted by the second movable plate 48.

The first orifice 58 is suitably tuned of its length and cross sectional fluid flow area, in order to provide excellent vibration damping characteristics based on resonance of the fluid mass flowing therethrough, with respect to low-frequency large-amplitude vibrations such as engine shakes and bounces, whose frequency is in the neighborhood of 6 Hz and whose amplitude is about ±1 mm. The maximum distance of movement of the second movable plate 48 is not large enough to absorb the entire amount of change in the pressure in the pressure-receiving chamber 38 when the engine mount receives such a low-frequency large-amplitude vabrational load. In other words, the maximum distance of movement of the second movable plate 48 is determined so that a relatively large amount of flow of the fluid occurs through the first orifice 58, for the equilibrium chamber 40 to absorb the residual pressure rise in the pressure-receiving chamber 38, upon application of the low-frequency large-amplitude vibrations to the engine mount.

The second orifice 76 is also tuned of its length and cross sectional fluid flow area, in order to provide a sufficiently low dynamic spring constant or high vibration isolating characteristics based on resonance of the fluid mass flowing therethrough, with respect to medium-frequency medium-amplitude vibrations such as engine-idling vibrations, whose frequency is in the neighborhood of 20-30 Hz and whose amplitude is about ±0.15 mm. The maximum distance of movement of the first movable plate 46 is not large enough to absorb the entire amount of change in the pressure in the pressure-receiving chamber 38 upon application of such medium-frequency medium-amplitude vibrations. At the same time, the above-indicated maximum distance of movement of the second movable plate 48 is also determined such that the pressure change in the intermediate chamber 68 caused by the fluid flow thereinto through the second orifice 76 can be completely accommodated or absorbed by the displacement of the second movable plate 48, when the medium-frequency medium-amplitude vibrational load is applied to the engine mount. In other words, a relatively large amount of fluid flow takes place through the second orifice 76 into the intermediate chamber 68, whereby the second movable plate 48 is displaced by a distance sufficient to absorb the pressure rise in the chamber 68. It is noted that the first orifice 58 permits substantially no fluid flow therethrough, or does not function as a fluid passage, as if it were closed, when the applied vibrational load has a medium frequency and a medium amplitude, as indicated above.

Further, the opening 42 of the annular structure 44 in which the first and second movable plates 46, 48 are movably disposed, more precisely, the dimensions of the support flanges 62, 64, 66 of the annular members 60, 50, 52 which cooperate with the movable plates 46, 48 to define a fluid passage between the pressure-receiving and equilibrium chambers 38, 40 are determined so as to provide excellent vibration isolating characteristics (sufficiently low dynamic spring constant) based on resonance of the fluid masses due to the oscillating movements of the movable plates 46, 48, when the engine mount receives high-frequency small-amplitude vibrations such as booming noises, whose frequency is in the neighborhood of 100 Hz and whose amplitude is about ±0.03 mm. Further, the maximum distance of movement of the first movable plate 46 is further determined so that the pressure change in the pressure-receiving chamber 38 upon application of such high-frequency small-amplitude vibrations may be completely absorbed by the movement of the movable plate 46, with a sufficient amount of the fluid flow through the opening 42. It is noted that both the first orifice 58 and the second orifice 76 do not function as fluid passage, with respect to the high-frequency small-amplitude vibrations, as if these orifices were in the closed state.

As described above, the instant engine mount is capable of providing an excellent damping effect based on the resonance of the fluid mass in the first orifice 58, with respect to the low-frequency large-amplitude vibrations, and providing an improved isolating effect based on the resonance of the fluid masses in the second orifice 76 and opening 42, with respect to the medium-frequency medium-amplitude to high-frequency small-amplitude vibrations.

Described differently, the instant engine mount is comparable with the conventional fluid-filled elastic mounting structure, in terms of vibration damping characteristics with respect to the low-frequency large-amplitude vibrations, and dynamic spring constant or vibration isolating characteristics with respect to the high-frequency small-amplitude vibrations, but is significantly superior than the conventional mounting structure, in terms of the vibration isolating characteristics with respect to the medium-frequency medium-amplitude vibrations. The instant engine mount is particularly effective to isolate the engine-idling vibrations.

In the engine mount according to the present embodiment, the first and second movable plates 46, 48 made of a suitable metal or other suitable rigid material are movably supported at their circumferential edge portions by the inner support flanges 62, 64, 66 of the annular structure 44, which define the central opening 42 of the partition assembly 36. This arrangement makes it possible to design the opening 42 with a relatively large cross sectional fluid flow area, thereby permitting the resonance frequency of the fluid flow through the opening 42, to a relatively high level, whereby the vibrations having an accordingly high frequency can be isolated based on the resonance of the fluid flowing through the opening 42.

Further, the operating noises due to abutting contact of the first and second movable plates 46, 48 with the support flanges 62, 64, 66 of the annular structure 44 are reduced by the annular rubber layers 67 which cover the circumferential edge portions of the movable plates 46, 48.

While the present invention has been described in its presently preferred embodiment for illustrative purpose only, it is to be understood that the invention is not limited to the details of the illustrated embodiment, but may be otherwise embodied.

For instance, the second orifice 76 may be replaced by an orifice which is formed in associated with the second movable plate 48. In this case, too, the same effect as provided by the orifice 76 may be provided, provided that the maximum distance of movement of the first movable plate 46 is larger than that of the second movable plate 48, so that the intermediate chamber 68 may function as a pressure-receiving chamber, with a relatively large amount of the fluid flowing through the second orifice, as in the illustrated embodiment.

The first orifice 58 need not be provided in the partition assembly 36, but may be formed elsewhere. For example, the first orifice may be formed through the second support member 12.

While the illustrated embodiment is adapted to suitably function as an engine mount of a motor vehicle, the principle of the present invention is equally effectively applicable to other types of fluid-filled elastic mounting structures or devices.

It will be understood that the present invention may be embodied with various other changes, alterations, modifications and improvements, which may occur to those skilled in the art, without departing from the spirit and scope of the invention defined in the following claims.

What is claimed is:

1. A fluid-filled elastic mounting structure including (a) a first and second support member which are opposed to and spaced apart from each other in a load-receiving direction in which a vibrational load is applied to the mounting structure, (b) an elastic body interposed between the first and second support members, for elastically connecting the first and second support members, (c) a closure member which has a flexible portion and which is secured to the second support member, so as to cooperate with the elastic body to define therebetween a fluid chamber filled with a non-compressible fluid, (d) a partition assembly disposed within the fluid chamber, so as to divide the fluid chamber into a pressure-receiving chamber on the side of the elastic body, and an equilibrium chamber on the side of the closure member, and (e) first-orifice defining means for defining a first orifice for fluid communication between the pressure-receiving chamber and the equilibrium chamber, wherein the improvement comprises:

said partition assembly including an opening formed in a central portion thereof, such that the pressure-receiving chamber and the equilibrium chamber communicate with each other through the opening;

a first and a second movable member disposed within the opening of the partition assembly, such that the first and second movable members are spaced apart from each other by a suitable distance in the load-receiving direction of the mounting structure, and cooperate with each other to define an intermediate fluid chamber, one of said first and second movable members being movable in said load-receiving direction over a first distance while the other of said movable members is movable in said load-receiving direction over a second distance larger than said first distance; and second orifice-defining means for defining a second orifice for fluid communication of the intermediate fluid chamber with one of the pressure-receiving and equilibrium chambers which corresponds to said one movable member, said second orifice-defining means including said one movable member, and an orifice-defining member movable with said one movable member.

2. A fluid-filled elastic mounting structure according to claim 1, wherein said first movable member is disposed as said one movable member on the side of said pressure receiving chamber, said second orifice holding said intermediate fluid chamber in communication with said pressure-receiving chamber.

3. A fluid-filled elastic mounting structure according to claim 2, wherein said orifice-defining member is secured to said first movable member, and said orifice-defining member and the first movable member define therebetween an annular space, said orifice-defining member and the first movable member having communication holes through which said annular space communicates with the pressure-receiving chamber and said intermediate chamber.

4. A fluid-filled elastic mounting structure according to claim 1, further comprising a stopper member for preventing an excessive amount of relative displacement of the first and second support members away from each other in said load-receiving direction.

5. A fluid-filled elastic mounting structure according to claim 1, wherein the partition assembly includes a first and a second annular members which are secured at radially outer circumferential edges thereof to the second support member, said central opening being defined by radially inner circumferential edges of the annular members.

6. A fluid-filled elastic mounting structure according to claim 5, wherein said annular members cooperate with each other to define an annular space therebetween, and have communication holes through which said annular space communicates with the pressure-receiving and equilibrium chambers, said first orifice being defined by said annular space and said communication holes.

7. A fluid-filled elastic mounting structure according to claim 5, wherein the partition assembly further includes a third annular member secured to one of said first and second annular members which is adjacent to the pressure-receiving chamber, said third annular member and said first and second annular members have respective support flanges whose radially inner circumferential edges define said central opening, said support flanges being spaced apart from each other in said load-receiving direction, said first movable member being movable between the support flanges of said third annular member and said one of the first and second annular members, while said second movable member being movable between the support flanges of said first and second annular members.

8. A fluid-filled elastic mounting structure according to claim 1, wherein the elastic body has a stopper portion which is abuttable on the first support member, to thereby prevent an excessive amount of relative displacement of the first and second support members toward each other in said load-receiving direction.

9. A fluid-filled elastic mounting structure including (a) a first and a second support member which are opposed to and spaced apart from each other in a load-receiving direction in which a vibrational load is applied to the mounting structure, (b) an elastic body interposed between the first and second support members, for elastically connecting the first and second support members, (c) a closure member which has a flexible portion and which is secured to the second support member, so as to cooperate with the elastic body to define therebetween a fluid chamber filled with a non-compressible fluid, (d) a partition assembly disposed within the fluid chamber, so as to divide the fluid chamber into a pressure-receiving chamber on the side of the elastic body, and an equilibrium chamber on the side of the closure member, and (e) a first orifice for fluid communication between the pressure-receiving chamber and the equilibrium chamber, wherein the improvement comprises:

said partition assembly including an opening formed in a central portion thereof, such that the pressure-receiving chamber and the equilibrium chamber communicate with each other through the opening;

a first and a second movable member disposed within the opening of the partition assembly, such that the first and second movable members are spaced apart from each other by a suitable distance in the load-receiving direction of the mounting structure, and cooperate with each other to define an intermediate fluid chamber, said first movable member being disposed on the side of said pressure-receiving chamber; and an orifice-defining member secured to said first movable member such that the orifice-defining member and the first movable member cooperate with each other to define a second orifice for fluid communication between said intermediate fluid chamber and said pressure-receiving chamber.

10. A fluid-filled elastic mounting structure according to claim 9, wherein said orifice-defining member and said first movable member define therebetween an annular space, and have communication holes through which said annular space communicates with the pressure-receiving chamber and said intermediate fluid chamber, to thereby provide said second orifice.

11. A fluid-filled elastic mounting structure comprising:

a first and a second support member which are opposed to and spaced apart from each other in a load-receiving direction in which a vibrational load is applied to the mounting structure;

an elastic body interposed between the first and second support members, for elastically connecting the first and second support members;

a closure member which has a flexible portion and which is secured to the second support member, so as to cooperate with the elastic body to define therebetween a fluid chamber filled with a non-compressible fluid;

a partition assembly disposed within the fluid chamber, so as to divide the fluid chamber into a pressure-receiving chamber on the side of the elastic body, and an equilibrium chamber on the side of the closure member;

said partition assembly having an opening formed in a central portion thereof, such that the pressure-receiving chamber and the equilibrium chamber communicate with each other through the opening;

said partition assembly including a first and a second movable member disposed within said opening such that the first and second movable members are spaced apart from each other so as to define therebetween an intermediate fluid chamber;

one of said first and second movable members being movable over a first distance determined so as to absorb a pressure change in said pressure-receiving chamber upon application of vibrations having high frequencies of about 100-300 Hz;

means for defining a first orifice for fluid communication between the pressure-receiving chamber and the equilibrium chamber, so that said equilibrium chamber absorbs a pressure change in said pressure-receiving chamber upon application of vibrations having low frequencies of about 5-15 Hz;

means for defining a second orifice for fluid communication between said intermediate fluid chamber and one of the pressure-receiving and equilibrium chambers which corresponds to said one movable member; and the other of said first and second movable member being movable over a second distance larger than said first distance, so that said intermediate fluid chamber absorbs a pressure change in said one of the pressure-receiving and equilibrium chambers upon application of vibrations having medium frequencies of about 20-30 Hz.

* * * * *